United States Patent
Nilsson

[11] Patent Number: 6,151,377
[45] Date of Patent: Nov. 21, 2000

[54] COMPUTER TOMOGRAPHIC METHOD AND A COMPUTER TOMOGRAPH

[76] Inventor: Stefan Nilsson, Rosenberg, S-590 52 Nykil, Sweden

[21] Appl. No.: 09/214,279

[22] PCT Filed: Jul. 1, 1997

[86] PCT No.: PCT/SE97/01188

§ 371 Date: Jan. 25, 1999

§ 102(e) Date: Jan. 25, 1999

[87] PCT Pub. No.: WO98/00063

PCT Pub. Date: Jan. 8, 1998

[30] Foreign Application Priority Data

Jul. 1, 1996 [SE] Sweden ................................. 9602594

[51] Int. Cl.$^7$ ....................................................... A61B 6/03
[52] U.S. Cl. ................................................. 378/4; 378/901
[58] Field of Search ................................... 378/4, 15, 901

[56] References Cited

U.S. PATENT DOCUMENTS 4,482,958  11/1984  Nakayama et al. ..................... 378/14
5,253,171  10/1993  Hsiao et al. ............................. 378/4
6,061,422   5/2000  Miyazaki et al. ...................... 378/15

OTHER PUBLICATIONS

W.A. Gotz et al., "A Fast Digital Radon Transform—an Efficient Means for Evaluating the Hough Transform", pp. 711–718, Pattern Recognition, vol. 29, No. 4, 1996.

Gabor T. Herman et al., "Algebraic Reconstruction Techniques Can Be Made Computationally Efficient", IEEE Transactions on medical Images, vol. 12, No. 3, Sep. 1993, pp. 600–609.

*Primary Examiner*—David V. Bruce
*Attorney, Agent, or Firm*—Young & Thompson

[57] ABSTRACT

In conventional backprojection, each pixel value is calculated separately. With N pixels $N^3$ additions are necessary. According to the invention, the summation is instead divided into partial sums which are then used to form new partial sums in a hierarchial way. A substantial computational reduction is obtained because a partial sum has approximately the same value for many neighboring points, and that interpolations are feasible. Instead of $N^3$ additions, the number of additions can be reduced to the order of magnitude of $N^2 \log N$.

7 Claims, 2 Drawing Sheets

COMPUTER TOMOGRAPHIC METHOD AND A COMPUTER TOMOGRAPH

INTRODUCTION

The present invention regards computer tomography and methods of evaluating tomography data. The method of the invention can be applied to all kinds of tomographic imaging, whether registered by X-ray or radioactive absorption, by magnetic resonance (MR) or positron emission tomography (PET). In all those cases are obtained experimental values in the form of line integrals along multitudes of straight lines. The typical CT measurement consists of mounting an X-ray tibe on a rotatable circular ring and set of detectors in a row opposite the tube.

The invention therefore regards a computer tomography method of the kind recited in the preamble of claim 1.

In computerized tomographic imaging (CT) the inverse problem consists of determining a function from its line integrals. We examine three different types of measured data sets, with different scanning geometries, namely two versions of parallel scanning (sinogram, linogram) and fan-beam scanning (even cone-beam scanning). We will study the Filtered Backprojection Method (FBM) which is one of the most well-known and widely used methods. The reason for the widh use of the filtered backprojection algorithm is the high image quality.

A serious problem in prior art evaluation of tomographic data in order to obtain an image is the heavy computational complexity for the back-projection operator, which is of the order $N^3$. It is the general object of the invention to obtain an improved method of transforming tomographic data into images, which is less complex and can give improvement either in computational speed or in an increased number of voxels/pixels in an image.

This object and other objects and advantages are obtained, according to the invention, by means of a computer tomography method of the kind recited, which is characterized by the steps recited in claim 1. Advantageous embodiments are recited in dependent claims.

Figure 1:
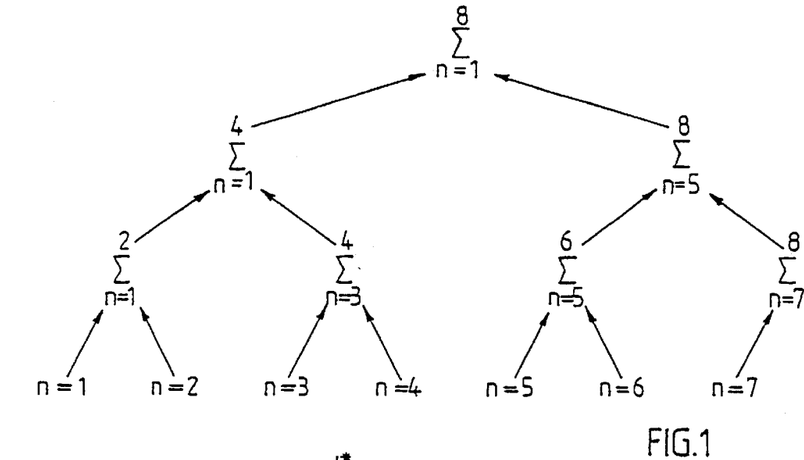
FIG. 1 The summation process for N=8 . . . 21

In conventional backprojection each pixel value is calculated separately, which means that O(N) operations are required for each pixel. Then the total number of operations will be of the order $O(N^3)$. Instead of directly doing the $N^3$ additions the basic idea behind the new algorithm is to divide the summation into partial sums, which then are used to form new partial sums in a dyadic and hierarchial way, see FIG. 1. The reason for this procedure is the benefit in computational reduction due to the fact that a partial sum has approximately the same value for many neighbouring points. Thus each value of a partial sum is calculated once, but used several times when forming a new partial sum from two partial sums in a preceding level of the hierarchy.

Although in the present description, the invention is exemplified with forming hierachial partial sums in a dyadic way, which is presently believed to be the best mode, it is also possible to sum more than two groups, namely, each time a number which is a prime number. It is even not necessary to use the same prime number in each stage.

In a preferred embodiment, families of lines are combined two and two, indicating that the total number of line families is a power of two. With a number of pixels/voxels of 512×512 an an equal number of families, i.e. angles of registration, this condition is fulfilled. However, without using the full advantages of the invention, it is possible in the partial sum calculation to combine three (or five, or any prime number) space distributions by making sums for those points where the lines for the largest angular difference intersect, and adding interpolation values for the further distributions.

It is also possible to add line integrals for intermediate lines, for which no measurement was made, i.e. by setting intermediate (non-measured) line integrals to the mean value of the adjacent lines, for which a measurement was made.

Although the method is most easily understood for a case where all the line families belong to the same plane, which is the most common configuration in practice, and which is exemplified as the fan-type, the sinogram and the linogram, it may also be adapted to the cone-beam case, where radiation from a source fills a cone, an detection is made in a two-dimensional arry of detectors. Each detector then corresponds to a line through the field swept, and the contraption and the object are mutually rotated. As shall be shown, a considerable saving in calculations may be obtained also in this case.

In a special case, where each family of lines consists of lines which are mutually parallel, it is possible, in a very favourable way, to obtain values for points which are equidistant in a rectangular screen pattern. This is obtained by making the two last line families, for which sums at intersections are calculated, be a mutually right angles. Thereby, in principle, the last repeated second step is performed by two combined groups, symmetrized in relation to a direction at right angles to an angle belonging to a family of lines which is at an extreme end of said enumerable order, thus obtaining a set of sum values which correspond to pixels in a cartesian system of screen pattern.

List of Figures

2 The filtered backprojection algorithm for sinogram

In the parallel scanning geometry a cross-section of the human body is scanned by a set of equally spaced parallel X-ray beams for a number of equally distributed directions. Thus the recorded detector values correspond to a discrete set of values from the Radon transform. The (n-dimensional) Radon transform of a function f on $R^n$ is defined by $$(Rf)(\theta, s) = \int_{X \cdot \theta = s} f(X) dX,$$

which is the integral of f over the hyperplane whose normal is $\theta \in S^{n-1}$, the unit sphere in $R^n$, and with (signed) distance $s \in R^1$ from the origin. The term sinogram is chosen since an attenuation function consisting of a δ-function, Dirac function, gives a Radon transform supported on a sinusoid in parameter space, i.e., (θ,s)-space.

Before giving the inversion formula we will describe the backprojection. The (n-dimensional) backprojection operator $R^\#$ maps a function g on $S^{n-1} \times R^1$ into the set of functions on $R^n$. The backprojection operator is defined by $$(R^{\#}g)(X) = \int_{S^{n-1}} g(\theta, X \cdot \theta) d\theta, \ X \in R^n.$$

$R^{\#}$ is the dual operator of R. Hence $$\int_{S^{n-1}} \int_{R^1} (Rf)(\theta, s) g(\theta, s) ds d\theta = \int_{R^n} f(X) (R^{\#}g)(X) dX.$$

The filtered backprojection algorithm is a numerical implementation of the inversion formula $$f = \frac{1}{2} (2\pi)^{1-n} R^{\#} H^{n-1} (Rf)^{(n-1)},$$

where H denotes the Hilbert transform and $(\cdot)^{(n-1)}$ denotes the $(n-1)$st derivative both with respect to the variable s.

3 Fast backprojection for sinogram

In this section we will develope a method for backprojection, requiring only $O(N^2 \log N)$ operations. This method can be used on the (n-dimensional) backprojection operator but in order to describe the main idea it suffices to study the case n=2. Then $$(R^{\#}g)(X) = \int_{S^1} g(\theta, X \cdot \theta) d\theta,$$

where X=

$$X = \begin{pmatrix} x \\ y \end{pmatrix} \in R^2$$

$\in R^2$ and $\theta =$ $$\theta = \begin{pmatrix} \cos v \\ \sin v \end{pmatrix} \in S^1,$$

$\in S^1$, or, with slightly different notation, $$(R^{\#}g)(x, y) = \int_0^{2\pi} g(v, x \cos v + y \sin v) dv.$$

Strictly we should write $g(\theta(v), x \cos v + y \sin v)$. We assume that $g(\theta, s)$ satisfies the condition $g(-\theta, -s) = g(\theta, s)$ which implies that $g(v + \pi, -s) = g(v, s)$. Then $$(R^{\#}g)(x, y) = 2 \int_0^{\pi} g(v, x \cos v + y \sin v) dv.$$

Let $g(v, s)$ be samples at the points $(g(v_m, s_n))$ where $$\begin{cases} v_m = m \frac{\pi}{N} & m = 0, \ldots, N-1 \\ s_n = n \frac{2}{N} & n = -\frac{N}{2}, \ldots, \frac{N}{2} \end{cases}$$

$N = 2^J$, J positive integer. In order to compute the backprojection, we need to calculate the sums $$(R^{\#}g)\left(\frac{2k}{N}, \frac{2l}{N}\right) \approx \frac{2\pi}{N} \sum_{m=0}^{N-1} g\left(v_m, \frac{2}{N}(k \cos v_m + l \sin v_m)\right), \quad (3.1)$$

for $k^2 + l^2 \leq$ $$k^2 + l^2 \leq \frac{N^2}{4},$$

where k and l are integers.

Since g is defined on a rectangular grid we might use linear interpolation for the variable s in the sum of formula 3.1 We choose instead the following procedure.

First extend the definition of g by increasing the number of sampling points in the s-coordinate with a factor e, using linear interpolation, and introduce the notation $$G(m, n) = g\left(\frac{m\pi}{N}, \frac{2n}{eN}\right)$$

for $m = 0, \ldots, N-1$ and $$n = -\frac{eN}{2}, \ldots, \frac{eN}{2}.$$

Then, take $$(R^{\#}g)\left(\frac{2k}{N}, \frac{2l}{N}\right) \approx \frac{2\pi}{N} \sum_{m=0}^{N-1} G(m, [e(k \cos v_m + l \sin v_m)]),$$

where [a] denotes a rounded to the nearest integer.

Now, instead of directly doing the $N^3$ additions we will divide the summation into partial sums, which then are used to form new partial sums in a hierarchial way. The reason for this procedure is the benefit in computational reduction, due to the fact that a partial sum has the same value for many neighbouring points. First we define $$I(j, i, k, l) = \sum_{m=(i-1) \cdot 2^j}^{i \cdot 2^j - 1} G(m, [ek \cos v_m + l \sin v_m])$$

for $0 \leq j \leq J$, $1 \leq i \leq 2^{J-j}$. Then we have the following simple relation $$I(j, i, k, l) = I(j-1, 2i-1, k, l) + I(j-1, 2i, k, l).$$

In the following description we will show that the number of points (k,l) where the value of the partial sum I(j,i,k,l) has to be calculated is approximately twice as large as the number of points where the value of a partial sum I(j-1,i,k,l) has to be calculated. Hence, since the number of partial sums with different i-values at level j is $N/2^j$, the total number of summation points for all partial sums at level j is approximately the same as for level j-1 and since there are $J =^2 \log N$ j-levels we conclude that the total number of operations for all levels will be proportional to $N^2 \log N$.

The variable i just stands for a rotation about the origin. Thus it will be convenient to make the following definition $$I^*(j, i, k^*, l^*) = \sum_{m=0}^{2^j - 1} G(m + (i-1) \cdot 2^j, [e(k^* \cos v_m + l^* \sin v_m)]).$$

Then we have $$I(j,i,k,l)=I^*(j,i,k \cos v_{(i-1)2j}+l \sin v_{(i-1)2j}, l \cos v_{(i-1)2j}-k \sin v_{(i-1)2j}) \quad (3.2)$$

and $$I^*(j,i,k^*,l^*)=I^*(j-1,2i-1,k^*,l^*)+I^*(j-1,2,i,k^* \cos v_{2j-1}+l^* \sin v_{2j-1}, l^* \cos v_{2j-1}-k^* \sin v_{2j-1}). \quad (3.3)$$

B definition we have $$I^*(0,i,k^*,l^*)=G(i-1,[ek^*]).$$

Figure 2:
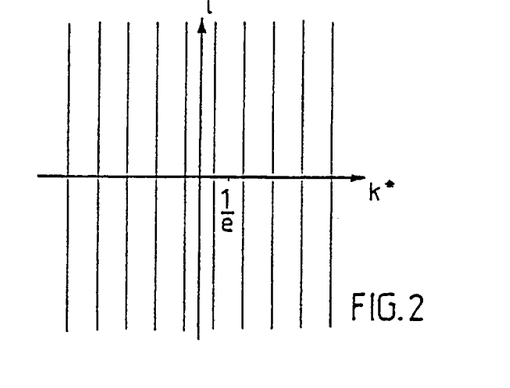
FIG. 2 Division of the (k*,l*)-plane for I*(0,i,k*,l*) . . . 21

We now see that $I^*(0,i,k_1^*,l_1^*)=I^*(0,i,k_2^*,l_2^*)$ if the points $(k_1^*,l_1^*)$ and $(k_2^*,l_2^*)$ are located in the same strip, see FIG. 2.

Figure 3:
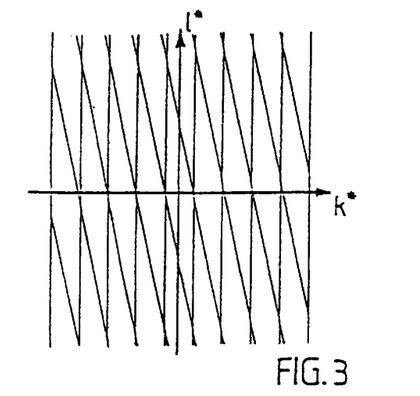
FIG. 3 Division of the (k*,l*)-plane for I*(1,i,k*,l*) . . . 22

Now consider the next level, j=1. We have $$I^*(1,i,k^*,l^*)=G(2i-2,[ek^*])+G(2i-1,[e(k^* \cos v_1+l^* \sin v_1)]),$$

and we conclude that $I^*(1,i,k_1^*,l_1^*)=I^*(1,i,k_2^*,l_2^*)$ if $(k_1^*,l_1^*)$ and $(k_2^*,l_2^*)$ are located in the same region, see FIG. 3. Let $$k^* = \frac{a}{e}$$

$$k^* \cos v_1 + l^* \sin v_1 = \frac{b}{e}$$

According to FIG. 3 it will be necessary to calculate $I^*(1,i,k^*,l^*)$ only for a and b integers. Therefore we introduce, in general $k^*$ and $l^*$ will not be integers, $$\tilde{I}(1,i,a,b)=I^*(1,i,k^*,l^*)$$

where $$\begin{cases} a = ek^* \\ b = e(k^* \cos v_1 + l^* \sin v_1). \end{cases}$$

Hence $$\tilde{I}(1,i,a,b)=G(2i-2,a)+G(2i-1,b).$$

Can we do a similar division of the $(k^*,l^*)$-plane for $I^*(j,i,k^*,l^*)$, j>1? Let $$k^* = \frac{a}{e}$$

$$k^* \cos v_{2j-1} + l^* \sin v_{2j-1} = \frac{b}{e}$$

Figure 4:
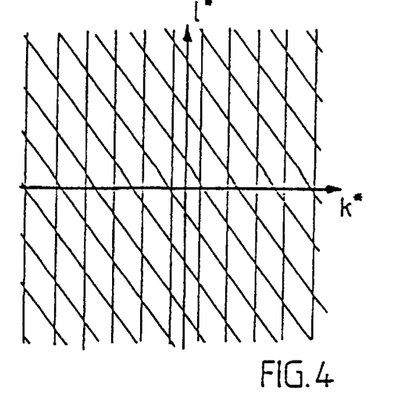
FIG. 4 Division of the (k*,l*)-plane for I*(j,i,k*,l*) . . . 23

If two points $(k_1^*,l_1^*)$ and $(k_2^*,l_2^*)$ are in the same region, see FIG. 4, we want $I^*(j,i,k_1^*,l_1^*)=I^*(j,i,k_2^*,l_2^*)$, i.e.

$$|(k_1^*-k_2^*)\cos v_m+(l_1^*-l_2^*)\sin v_m| \le \frac{1}{e} \quad (3.4)$$

for m=0, . . . , $2^j-1$. In FIG. 4 we see that all regions approximately satisfy conditions (3.4) if $$v_{2j-1} \le \frac{\pi}{2},$$

which corresponds to $j \le J-1$. In the same way as for j=1 we introduce $$\tilde{I}(j,i,a,b)=I^*(j,i,k^*,l^*) \quad (3.5)$$

where $$\begin{cases} a = ek^* \\ b = e(k^* \cos v_{2j-1} + l^* \sin v_{2j-1}) \end{cases}$$

By equations (3.3) and (3.5) we see that we have the following relation $$\tilde{I}(j,i,a,b) \approx \tilde{I}(j-1,2i-1,a,b_1)+\tilde{I}(j-1,2i,a_1,b) \quad (3.6)$$

where $$a_1 = a\sin\frac{v_{2j-1}-1}{\sin v_{2j-1}} + b\sin\frac{v_{2j-1}}{\sin v_{2j-1}} \quad (3.7)$$

and $$b_1 = a\sin\frac{v_{2j-1}}{\sin v_{2j-1}} + b\sin\frac{v_{2j-1}-1}{\sin v_{2j-1}}, \quad (3.8)$$

By symmetry we have $$\tilde{I}(j,i,b,a) \approx \tilde{I}(j-1,2i-1,b,a_1)+\tilde{I}(j-1,2i,b_1,a) \quad \tilde{I}(j,i,-a,-b) \approx \tilde{I}(j-1,2i-1,-a,-b_1)+\tilde{I}(j-1,2i,-a_1,-b)$$

and $$\tilde{I}(j,a,a,a) \approx \tilde{I}(j-1,2i-1,a,a_1)+\tilde{I}(j-1,2i,a_1,a)$$

where $$a_1 = a\frac{\sin v_{2j-1-1} + \sin v_{2j-1}}{\sin v_{2j-1}}.$$

which means that we only have to compute $a_1$ and $b_1$ for $0 \le a \le |b|$.

The procedure suggested by this discussion of the partial sums leads to the following algorithm. We start by adding "extra" sample values by linear interpolation. Then we form partial sums of adjacent pairwise projections (A projection m consists of all sample points (G(m,n) where m is fixed.). The next step will be to form partial sums of four projections by adding two adjacent sums from the previous step. Thereafter we will subsequently form partial sums of 8,16,32, . . . projections. The iteration stops when full backprojection is obtained, that is, when the sum consists of all projections. A partial sum is only determined in points where two lines intersect whose angles are $v_0$ and $v_{2j-1}$, with respect to the $(k^*,l^*)$-plane, and whose perpendicular distances to the origin are $$\frac{2n_1}{eN}$$

and $$\frac{2n_2}{eN}$$

respectively, $n_1$ and $n_2$ integers. If $e \geq 2$ the process is stopped before we obtain $\tilde{I}(J-1,i,a,b)$. If the total number of points where the partial sums, at level j, are calculated is of the same order as the number of pixels, the process is stopped and the pixels are interpolated directly from the values of the partial sums at level j−1. The pixel values are then calculated from equation (3.2). When $e=1$ we calculate all the partial sums up to $\tilde{I}(J-1,i,a,b)$. Although the number of points where $\tilde{I}(J-1,i,a,b)$ is calculated is of the same order as the number of pixels they do not coincide. This is caused by $$\upsilon_{2^{j-1}-1} = \frac{\pi}{2} - \frac{\pi}{N} \neq \frac{\pi}{2}.$$

Therefore we have to calculate the pixel values by equation (3.2) which is unnecessary if we instead do the following. We want to calculate $$\sum_{m=0}^{N/2} G(m, [k\cos\upsilon_m + l\sin\upsilon_m]) \qquad (3.9)$$

and $$\sum_{m=N/2}^{N} G(m, [k\cos\upsilon_m + l\sin\upsilon_m]). \qquad (3.10)$$

But now $$\upsilon_{N/2} - \upsilon_0 = \upsilon_N - \upsilon_{N/2} = \frac{\pi}{2}$$

so the points where we calculate the sums are in fact the pixels. One problem is that each sum, (3.9) and (3.10), consist of $2^{J-1}+1$ elements. However in order for the summation process to work the number of elements in a sum has to be a power of two. Therefore we calculate $$\sum_{m=0}^{N/4-1}, \sum_{m=N/4+1}^{N/2}, \sum_{m=N/2}^{3N/4-1}$$

and $$\sum_{m=3N/4+1}^{N}.$$

$$\sum_{m=0}^{N/2} G(m, [k\cos\upsilon_m + l\sin\upsilon_m]) = \sum_{m=0}^{N/4-1} + \sum_{m=N/4+1}^{N/2} + G\left(\frac{N}{4}, \left[\frac{k+l}{\sqrt{2}}\right]\right)$$

and $$\sum_{m=N/2}^{N} G(m, [k\cos\upsilon_m + l\sin\upsilon_m]) = \sum_{m=N/2}^{3N/4-1} + \sum_{m=3N/4+1}^{N} + G\left(\frac{3N}{4}, \left[\frac{l-k}{\sqrt{2}}\right]\right).$$

Note that since the partial sums $$\sum_{m=0}^{N/2}$$

and $$\sum_{m=N/2}^{N}$$

both contain the projection $m=N/2$ and the projection $m=0 \sim m=N$, we do the following. We assign the projections the values $G(N/2,n) \equiv 0$ and $G(0,n) \equiv 0$ in one of the partial sums.

The total number of different values for $$\frac{k+l}{\sqrt{2}} \text{ or } \frac{l-k}{\sqrt{2}}, k^2 + l^2 \leq \frac{N^2}{4},$$

is $\not\!\!c N\sqrt{2}$.

If j and i are fixed then the number of points where we calculate $\tilde{I}(j,i,a,b)$ is approximately the area of the circle, $$\frac{\pi N^2}{4},$$

divided by the are of one region (rhomb), $$\frac{1}{e^2 \sin\upsilon_{2^{j-1}}}, \text{ i.e., } e^2 \frac{\pi N^2}{4} \sin\upsilon_{2^{j-1}}.$$

Hence the total number of points at level j, $$1 \leq i \leq \frac{N}{2^j},$$

will be $$e^2 \frac{\pi N^3}{4 \cdot 2^j} \sin\upsilon_{2^{j-1}} < e^2 \frac{\pi N^3}{4 \cdot 2^j} \upsilon_{2^{j-1}} = e^2 \frac{\pi^2 N^2}{4} \frac{2^j - 1}{2^j}.$$

When j is small (j=1,2,3.), the overlapping of the circle by rhombs is not so efficient but then $$\frac{2^j - 1}{2^j} = \frac{1}{2}, \frac{3}{4}, \frac{7}{8}.$$

Hence the total number of points for all levels is $$< \frac{e^2\pi^2}{4}N^2\log N + N^2(e-1)$$

for $e \geq 2$ and $$< \frac{\pi^2}{4}N^2\log N$$

for $e=1$.

4 The filtered backprojection algorithm for linogram

In 1987 a new reconstruction algorithm was developed by Edholm [Edh87]. It is called the linogram method and is similar to the direct Fourier method but it is based on a different scanning geometry. In the parallel scanning geometry for sinogram, the projection lines, X-rays, are taken for a number of equally distributed directions which requres the detectors to rotate around the object. The linogram projections actually consist of two sets of projections. In the first linogram the detectors and the transmitters lie equally spaced on fixed lines parallel to the x-axis and the projection angles are $-45° \leq \theta \leq 45°$. Instead of equally distributed directions, $\delta\theta$=constant, we now get $\delta\tan\theta$=constant. In the second linogram the detectors and transmitters lie equally spaced on fixed lines parallel to the y-axis and $45° \leq \theta \leq 135°$, ($\delta\cot\theta$=constant).

Instead of the Radon transform it now will be natural to study the two linogram operators $R_1$ and $R_2$.

$$(R_1f)(u,v) = \int_{-\infty}^{\infty} f(u-vy \cdot y)dy$$

and $$(R_2f)(u,v) = \int_{-\infty}^{\infty} f(x, u+vx)dx.$$

The term linogram is chosen since an attenuation function consisting of a $\delta$-function gives a $R_1$- and $R_2$-transform supported on a line in parameter space, i.e., (u,v)-space.

There exist dual operators, backprojection operators, $R_2^{\#}$ and $R_2^{\#}$ given by $$(R_1^{\#}g)(x,y) = \int_{-1}^{1} g(x+vy, v)dv$$

and $$(R_2^{\#}g)(x,y) = \int_{-1}^{1} g(y-vx, v)dv.$$

We have $$\int_{-1}^{1}\int_{-\infty}^{\infty}(R_1f)(u,v)g(u,v)dudv = \int_{-\infty}^{\infty}\int_{-\infty}^{\infty}f(x,y)(R_1^{\#}g)(x,y)dxdy$$

and $$\int_{-1}^{1}\int_{-\infty}^{\infty}(R_2f)(u,v)g(u,v)dudv = \int_{-\infty}^{\infty}\int_{-\infty}^{\infty}f(x,y)(R_2^{\#}g)(x,y)dxdy.$$

The filtered backprojection algorithm for linogram is a numerical implementation of the inversion formula $$f = \frac{1}{2\pi}R_1^{\#}H(R_1f)^{(1)} + \frac{1}{2\pi}R_2^{\#}H(R_2f)^{(1)},$$

where H denotes the Hilbert transform and $(\cdot)^{(i)}$ denotes the derivative both with respect to the variable u.

5 Fast backprojection for linogram

Here the procedure of the summation for the backprojection is analogous to the one used for sinogram. It suffices to study the backprojection $R_1^{\#}$ and projection data from $R_1$ since $R_2^{\#}$ and $R_2$ corresponds to a rotation about the origin of 90° degrees. We want to determine $(R_1^{\#}g)(x,y)$ in the pixels (x,y)=

$$(x,y) = \left(\frac{2k}{N}, \frac{2l}{N}\right),$$

$N=2^J$ where J is a positive integer and k, l integers belonging to the disk $k^2+l^2 \leq$ $$k^2 + l^2 \leq \frac{N^2}{4}.$$

Then the function g(u,v) has to be sampled in the points $g(u_m, v_n)$, $$v_n = n\frac{2}{N} \quad n = -\frac{N}{2}, \ldots, \frac{N}{2} \text{ and } u_m = m\frac{2}{N},$$

m integer, for all $g(u_m, v_n)$ where the corresponding projection line intersect the unit circle. Therefore the number of parallel projection lines depends on the projection angle. For instance if n=0 we have $|m| \leq$ $$|m| \leq \frac{N}{2}$$

but if n=

$$n = \frac{N}{2}$$

we have $|m| \leq$ $$|m| \leq \sqrt{2} \cdot \frac{v}{2}.$$

We will divide the summation.

$$(R_1^{\#}g)\left(\frac{2k}{N}, \frac{2l}{N}\right) \approx \frac{2}{N}\sum_{n=-N/2}^{N/2} g\left(\frac{2}{N}(k+v_n \cdot l), v_n\right),$$

into partial sums in the same way as we did for sinogram. In order for the summation process to work, the number of elements in a sum has to be a power of two. Therefore we start by splitting the summation in the following way $$\frac{N}{2}(R_1^{\#}g)\left(\frac{2k}{N}, \frac{2l}{N}\right) \approx \quad (5.11)$$

$$\sum_{n=1}^{N/2} g\left(\frac{2}{N}(k+v_n\cdot l), v_n\right) + \sum_{n=-N/2}^{-1} g\left(\frac{2}{N}(k+v_n\cdot l), v_n\right) + g\left(\frac{2k}{N}, 0\right).$$

Then we divide the sum $$\sum_{n=1}^{N/2}$$

into partial sums (The procedure for $$\sum_{n=-N/2}^{-1}$$

is similar). Defin $$I(j, i, k, l) = \sum_{n=(i-l)\cdot 2^j+1}^{i\cdot 2^j} g\left(\frac{2}{N}(k+v_n\cdot l), v_n\right),$$

for $0 \leq j \leq J-1$, $1 \leq i \leq 2^{J-j-1}$. The procedure suggested by this discussion of the partial sums is analogous to the method described in section 3 on parge 8. A partial sum I(j,i,k,l) is only determined in points where two projection lines intersect, one projection line corresponds to $v_{(v-1)\cdot 2j+1}$ and the other to $v_{i\cdot 2j}$. If the projection line, which corresponds to $(u_a, v_{(i-1)\cdot 2j+1})$, intersects the projection line, which corresponds to $(u_b, v_{i\cdot 2j})$, at the point $(k_{j,i,a,b}, l_{j,i,a,b})$ in the (k,l)-plane we will use the notation $$\tilde{I}(j,i,a,b) = I(j,i,k_{j,i,a,b}, l_{j,i,a,b}).$$

The projection line $x = u_m - v_n \cdot y$ is the straight line through the points $(m+n, -N/2)$ and $(m-n, N/2)$ in the (k,l)-plane. We have $$\begin{cases} k_{j,i,a,b} = a \cdot \dfrac{i \cdot 2^j}{2^j - 1} - b \cdot \dfrac{(i-1)\cdot 2^j + 1}{2^j - 1} \\ l_{j,i,a,b} = \dfrac{N}{2} \cdot \dfrac{b-a}{2^j - 1} \end{cases}.$$

Since we only are interested in points on the disc $$k^2 + l^2 \leq \frac{N^2}{4}$$

we get $$|b-a| \leq 2^j - 1.$$

We obtain a similar relation for linogram as relation (3.6) for sinogram. We have $$\tilde{I}(j,i,a,b) \approx \tilde{I}(j-2i-1, a, b_1) + \tilde{I}(j-2i, a_1, b)$$

where $$a_1 = \frac{2^{j-1} - 1}{2^j - 1} \cdot a + \frac{2^{j-1}}{2^j - 1} \cdot b = a + \frac{2^{j-1}}{2^j - 1} \cdot (b-a)$$

and $$b_1 = \frac{2^{j-1}}{2^j - 1} \cdot a + \frac{2^{j-1} - 1}{2^j - 1} \cdot b = a + \frac{2^{j-1} - 1}{2^j - 1} \cdot (b-a).$$

One major advantage of linogram compared to sinogram is that in the equations for $a_1$ and $b_1$ the terms which not are integers depend only on the difference b−a. Then if we use linear interpolation the interpolation factors will be constant if $\bar{b} = b-a = $constant. Hence if we introduce the notation $$\bar{I}(j,i,a,\bar{b}) = \tilde{I}(j,i,a,a+\bar{b})$$

we finally obtain the simple and very effective summation algorithm $$\bar{I}(j,i,a,\bar{b}) \approx (1-c)\bar{I}(j-1, 2i-1, a, \bar{b}-\bar{A}) + c\bar{I} \times (j-1, 2i-1, a, \bar{b}-\bar{A}-1)$$

$$+ (1-c)\bar{I}(j-1, 2i, a+\bar{A}, \bar{b}-\bar{A}) + c\bar{I}(j-1, 2i, a+\bar{A}+1, \bar{b}-\bar{A}-1)$$

where $$\bar{b} \cdot \frac{2^{j-1}}{2^j - 1} = \bar{A} + c.$$

$=\bar{A}+c$. $\bar{A}$ integer and $0 \leq c < 1$. Since c=0 for $\bar{b}=0,\pm(2^j-1)$ and by using that we have the same interpolation factors for $\pm\bar{b}$, we only have to compute $$\bar{b} \cdot \frac{2^{j-1}}{2^j - 1}$$

for $1 \leq \bar{b} \leq 2^j - 2$ (Let $1 \leq \bar{b} \leq 2^j - 2$ and $$\bar{b} \cdot \frac{2^{j-1}}{2^j - 1} = \bar{A} + c,$$

$=\bar{A}c$, $\bar{A}$ integer and $0 < c < 1$. Then $$-\bar{b} \cdot \frac{2^{j-1}}{2^j - 1} = -\bar{A} - 1 + (1-c).$$

$=-\bar{A}-1+(1-c)$. ). For sinogram, however, we had to compute $a_1$ and $b_1$ for all combinations of (a,b), $a \geq b$. Therefore the total number of times $a_1$ and $b_1$ have to be compute, at level j, is approximately $2(2^j-1)N$ for sinogram. Hence although the number of summations points (a,b) is approximately the same for linogram and sinogram the total computational complexity for $a_1$ and $b_1$ is O(N) for linogram but $O(N^2)$ for sinogram.

Finally we calculation $R^{\#}_1 g$ according to equation (5.11). Let $$\bar{II}(a,\bar{b}) = \bar{I}(J-1, 1, a, \bar{b})$$

and $\overline{I2}(a,\overline{b})$ for the corresponding partial sum $$\frac{2}{N}\sum_{n=1}^{N/2} g\left(\frac{2}{N}(k+v_{-n}\cdot l), v_{-n}\right),$$

where a corresponds to the direction $v_{-1}$ and $b=a+\overline{b}$ corresponds to the direction $v_{-N/2}$. Then $$\frac{N}{2}(R_1^\# g)\left(\frac{2k}{N}, \pm\frac{2l}{N}\right) \approx \left(1-\frac{2l}{N}\right)\overline{I1}(k, \pm l) + \frac{2l}{N}\overline{I1}(k\pm 1, \pm(l-1)) +$$

$$\left(1-\frac{2l}{N}\right)\overline{I2}(k, \mp l) + \frac{2l}{N}\overline{I2}(k\mp 1, \mp(l-1)) + g\left(\frac{2k}{N}, 0\right),$$

for $0 \leq l \leq N/2$.

The total computational complexity for the filtered fast backprojection algorithm for the linogram geometry is the same as for the sinogram geometry, i.e., $N^2 \log N$.

6 Cone-beam and Fan-beam geometry

The most common scanning geometries in medical tomography are the cone-beam geometry in the three-dimensional case, and the analogous fan-beam geometry in the two-dimensional case. In cone-beam scanning an X-ray source is rotating around the object along a circle while emitting cones of X-rays, which are recorded by a two-dimensional detector. In fan-beam scanning the cone-beams are screened off to a single plane and consequently recorded by a one-dimensional detector. Feldkamp, Davis and Kreiss [Fel84] have developed an approximate 3D-reconstruction algorithm for cone-beam projections. The computational complexity is of the order $O(N^4)$ for an image $f$ of $N \times N \times N$ pixels. By using the same technique as we did for the previous backprojection algorithms we will reduce the number of operations to $O(N^3 \log N)$.

Figure 5:
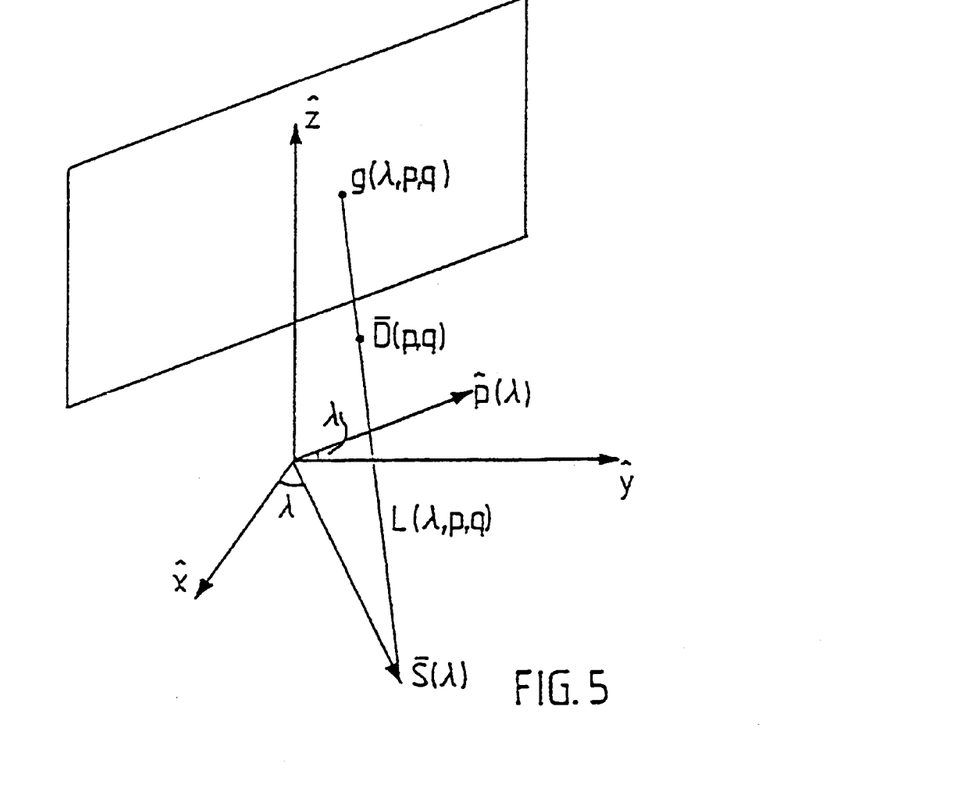
FIG. 5 Cone-beam geometry . . . 24

Next we will describe the cone-beam geometry. Let the position of the X-ray source be denoted by $\overline{S}(\lambda)$, $$\overline{S}(\lambda) = \begin{pmatrix} r\cos\lambda \\ r\sin\lambda \\ 0 \end{pmatrix} \epsilon R^3,$$

where $0 \leq \lambda < 2\pi$ and r constant. Hence the X-ray source rotates around the object along a circle in the xy-plane. The detector plane is always perpendicular to the vector $\overline{S}(\lambda)$, see FIG. 5. Hence it will be practical to introduce the plane spanned by the normed vectors $\hat{p}(\lambda)$ and $\hat{z}$, where $\hat{p}(\lambda)$ is the vector in the xy-plane which is perpendicular to $\overline{S}(\lambda)$, see FIG. 5. Then the measured data can be represented by a discrete set of values from $$g(\lambda, p, q) = \int_{L(\lambda,p,q)} f(\overline{x}) d\overline{x},$$

where $L(\lambda,p,q)$ is the straight line through the points $\overline{S}(\lambda)$ and $\overline{D}(p,q)=p\hat{p}(\lambda)+q\hat{z}$. Now the approximate inversion formula can be written as [Fel84]

$$f(\overline{x}) = \frac{1}{4\pi^2}\int_0^{2\pi} A(\lambda, \overline{x})^2 G(\lambda, A(\lambda, \overline{x})\overline{x}\cdot\hat{p}(\lambda), A(\lambda, \overline{x})z) d\lambda, \quad (6.12)$$

where $$A(\lambda, \overline{x}) = \frac{r^2}{r^2 - \overline{x}\cdot\overline{S}(\lambda)}$$

and $$G(\lambda, p, q) = \left(|\sigma|\left(\frac{r}{|\overline{S}(\lambda)-\overline{D}(p,q)|}g(\lambda, p, q)\right)^{(l,F,l)}(\lambda, \sigma, q)\right)^{(l,F^{-1},l)}(\lambda, p, q),$$

i.e., we multiply the projection data $g(\lambda,p,q)$ with a weight function $$\frac{r}{|\overline{S}(\lambda)-\overline{D}(p,q)|}$$

and then perform a rampfiltering in the variable p. The final backprojection in (6.12) is computationally the most heavy part of the inversion algorithm. The major difference between this backprojection and all the previous is the weight function $A(\lambda,\overline{x})$. Now let $g(\lambda,p,q)$ be sampled at the points $g(\lambda_a,p_b,q_c)$ where $r>1$ and $N=2^J$, with J integer, $$\begin{cases} \lambda_a = a\frac{\pi}{N} & a = 0, \ldots, 2N-1 \\ p_b = b\frac{2}{N} & b = -\frac{N}{2}, \ldots, \frac{N}{2} \\ q_c = c\frac{2}{N} & c = -\frac{N}{2}, \ldots, \frac{N}{2} \end{cases}$$

and we want to estimate $f(\overline{x})$ in the points $$\overline{x}_{k,l,m} = (x_k, y_l, z_m) = \left(\frac{2k}{N}, \frac{2l}{N}, \frac{2m}{N}\right),$$

k,l and m integers, for $$k^2 + l^2 + m^2 \leq \frac{N^2}{4}.$$

Thus $$f(\overline{x}_{k,l,m}) \approx \frac{1}{4\pi N}\sum_{a=0}^{2N-1} A(\lambda_a, \overline{x}_{k,l,m})^2 G(\lambda_a, A(\lambda_a, \overline{x}_{k,l,m})\overline{x}_{k,l,m}\cdot$$

$$\hat{p}(\lambda_a), A(\lambda_a, \overline{x}_{k,l,m})z_m),$$

where $$A(\lambda_a, \overline{x}_{k,l,m}) = \frac{r}{r - x_k\cos\lambda_a - y_l\sin\lambda_a} = A(a, k, l)$$

and $$\overline{x}_{k,l,m}\cdot\hat{p}(\lambda_a) = x_k\sin\lambda_a - y_l\cos\lambda_a = (\overline{x}\cdot\hat{p})(a,k,l).$$

If we now divide the sum into partial sums in the same way as we did in section 3 we get $$\sum_{a=(i-1)\cdot 2^j}^{i\cdot 2^j-1} (A(a,k,l))^2 G(\lambda_a, A(a,k,l)(\bar{x}\cdot\hat{p})(a,k,l), A(a,k,l)z_m).$$

Now if the interval is small, i.e. j small, we can make the approximation $$A(a,k,l) \approx A(a_{j,i},k,l) \quad (6.13)$$

where $a_{j,i}=i.2^j-(2^j+1)/2$, the average angle. Thus $$(A(a_{j,i},k,l))^2 \sum_{a=(i-1)\cdot 2^j}^{i\cdot 2^j-1} G(\lambda_a, A(a_{j,i},k,l)(\bar{x}\cdot\hat{p})(a,k,l), A(a_{j,i},k,l)z_m).$$

Define $$I(j,i,k,l,m) = \sum_{a=(i-1)\cdot 2^j}^{i\cdot 2^j-1} G(\lambda_a, (\bar{x}\cdot\hat{p})(a,k,l), z_m).$$

Then as before $$I(j,i,k,l,m)=I(j-1,2i-1,k,l,m)+I(j-1,2i,k,l,m)$$

Figure 6:
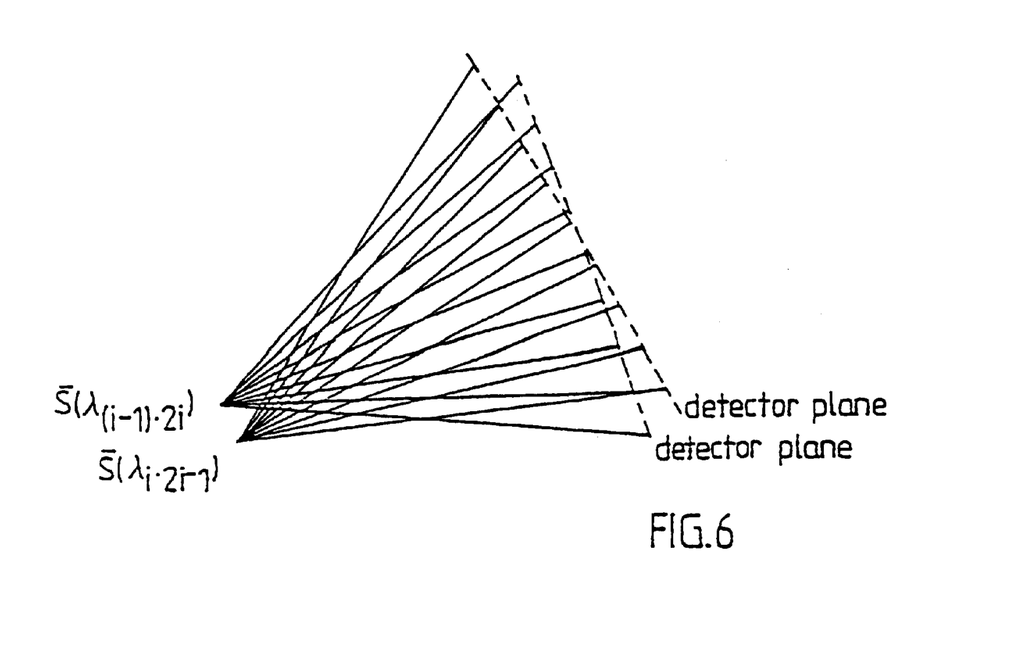
FIG. 6 Points of intersection for the partial sum I(j,i,k,l,m) . . . 25

A partial sum is only determined in points where two projection lines, projected on the xy-plane, intersect one projection line coming from $\bar{S}(\lambda_{(i-1)\cdot 2^j})$ and the other from $\bar{S}(\lambda_{i\cdot 2^j-1})$, see Fig 6. Now since $A(\lambda,\bar{x})$ obviously can't be approximated by a constant for all $\lambda$, except $\bar{x}=0$, the iteration process is stopped after a few steps, at level $j_0$, and the pixels are interpolated directly from the values of the partial sums at level $j_0$. We have $$f(\bar{x}_{k,l,m}) \approx \frac{1}{4\pi N} \sum_{i=1}^{J+1-j_0} A(a_{j_0,i},k,l)^2$$

$$I(j_0, i, A(a_{j_0,i},k,l)k, A(a_{j_0,i},k,l)l, A(a_{j_0,i},k,l)m).$$

At a first glance the method seems to be far less efficient for this backprojection than for the previous ones. But if we consider that the level j=1 reduces the number of summations by half and j=2 to approximately a fourth of the original number, and so on, we see that it is almost as efficient as the other. The accuracy of the approximation (6.13) depends strongly on the distance between the point (k,l) and the origin, i.e., $\sqrt{k^2+l^2}$. But since the inversion formula (6.12) is correct only for points in the plane z=0 and the artifacts in the other planes z=m increase with the absolute value of m the region of interest usually is $\sqrt{k^2+l^2+m^2} \ll r$. For (k,l) fixed point the accuracy of (6.13) depends on the angle difference $\lambda_{i\cdot 2^j-1}-\lambda_{(i-1)\cdot 2^j}$ not on the number of elements, $2^j$, in the partial sum.

$$\lambda_{i\cdot 2^j-1}-\lambda_{(i-1)\cdot 2^j} = \pi \frac{2^j-1}{N}$$

Hence if $N=2^J$ corresponds to that the iteration process is stopped at level $j_0$ then 2N corresponds to that the iteration process is stopped at level $j_0+1$ in order to have the same accuracy for the approximation (6.13). Then if the region of interest consists of $n^3$ pixels the number of operations for the backprojection will be of the order $O(n^2 N \log N)$. In the two-dimensional case, fan-beam scanning, the procedure is identical, m=0. Hence if the region of interest is of size $n^2$ the computational complexity will be $O(nN \log N)$.

References

[Edh87] P. R. Edholm. G. T. Herman, *Linograms in image reconstruction from projections* IEEE Transactions on medical imaging, Vol. MI-6, pp. 301–307, 1987.

[Fel84] L. A. Feldkamp, L. C. Davis, J. W. Kress, *Practical cone beam algorithms* Journal of optical soc. Am., Vol. A6, pp. 612–619, 1984.

[Nat86] F. Natterer, *The mathematics of computerized tomography* John Wiley & Sons Ltd, Chichester, 1986.

[Rad17] *Über die bestimmung von funktionen durch ihre integralwerte lägs gewisser mannigfaltigkeiten* Ber. Verh. S ächs. Akad. 69, p. 262, 1917.

Instead of using the approximation (6.13) we can even perform the multiplication of the weight function in an iterative way. In order to describe the main idea is suffices to study the two-dimensional case, z=0, the extension to the case $z \neq 0$ is obvious. We introduce the notations $\bar{x}=$ $$\bar{x} = \begin{pmatrix} x \\ y \end{pmatrix} \in R^2,$$

$\in R^2$, $L(\lambda,p)=L(\lambda,p,0)$ and $$I(j,i,\bar{x}) = \sum_{a=(i-1)\cdot 2^j}^{i\cdot 2^j-1} A(\lambda_a, \bar{x})^2 G(\lambda_a, A(\lambda_a, \bar{x})\bar{x}\cdot\hat{p}(\lambda_a)).$$

Let $\bar{x}(j,i,p_1,p_2)$ denote the point of intersection between the lines $L(\lambda_{(i-1)\cdot 2^j}, 2p_1/N)$ and $L(\lambda_{i\cdot 2^j-1}, 2p_2/N)$. Then we will use the notation $$\tilde{I}(j,i,p_1,p_2)=I(j,i,\bar{x}(j,i,p_1,p_2)).$$

We obtain a similar relation as (3.6)

$$\tilde{I}(j,i,p_1,p_2) \approx \tilde{I}(j-1,2i-1,p_1,d_1)+\tilde{I}(j-1,2i, d_2,p_2),$$

where $d_1$ and $d_2$ are calculated in a similar way as equations (3.7) and (3.8) for $a_1$ and $b_1$. In general $d_1$ and $d_2$ will not be integers. In order to obtain the correct value of the weight function we will apply the following procedure. We will only consider the partial sum $\tilde{I}(j-1,2i-1,p_1,d_1)$ the procedure for $\tilde{I}(j-1,2i,d_2,p_2)$ is analogous. We start by only consider the term which corresponds to $\tilde{a}=(i-1).2^j+2^{j-1}-1$, i.e., $$A(\lambda_{\tilde{a}}, \bar{x}_1)^2 G(\lambda_{\tilde{a}}, 2d_1/N) \approx A(\lambda_{\tilde{a}}, \bar{x}_1)^2(c_1 G(\lambda_{\tilde{a}}, 2[d_1]/N) +$$

$$c_2 G(\lambda_{\tilde{a}}, 2([d_1]+1)/N))$$

$$= c_1 \frac{A(\lambda_{\tilde{a}}, \bar{x}_1)^2}{A(\lambda_{\tilde{a}}, \bar{x}_2)^2} A(\lambda_{\tilde{a}}, \bar{x}_2)^2 G(\lambda_{\tilde{a}}, 2[d_1]/N)$$

$$= c_2 \frac{A(\lambda_{\tilde{a}}, \bar{x}_1)^2}{A(\lambda_{\tilde{a}}, \bar{x}_3)^2} A(\lambda_{\tilde{a}}, \bar{x}_3)^2 G(\lambda_{\tilde{a}}, 2([d_1]+1)/N),$$

where $\bar{x}_1=\bar{x}(j-1,2i-1,p_1,d_1)$, $\bar{x}_2=\bar{x}(j-1,2i-1,p_1,[d_1])$, $\bar{x}_3=\bar{x}(j-1,2i-1,p_1,[d_1]+1)$, $d_1=[d_1]+c_2$, $0 \leq c_2 < 1$ and $c_1+c_2=1$.

Therefore we will use the following approximation $$\tilde{I}(j-1, 2i-1, p_1, d_1) \approx c_1 \frac{A(\lambda_{\bar{a}}, \bar{x}_1)^2}{A(\lambda_{\bar{a}}, \bar{x}_2)^2} \tilde{I}(j-1, 2i-1, p_1, [d_1]) +$$

$$c_2 \frac{A(\lambda_{\bar{a}}, \bar{x}_1)^2}{A(\lambda_{\bar{a}}, \bar{x}_3)^2} \tilde{I}(j-1, 2i-1, p_1, [d_1]+1),$$

where $\bar{a}=(i-1)\cdot 2^j+2^{j-1}-1$. In order for the approximation to be accurate for all terms in the partial sum $\tilde{I}(j-1,2i-1,p_1,d_1)$ all weight functions which belong to the partial sum have to satisfy the condition $$\frac{A(\lambda_{a1}, \bar{x}(j-1, 2i-1, p_1, d_1))^2}{A(\lambda_{a1}, \bar{x}(j-1, 2i-1, p_1, d))^2} \approx \frac{A(\lambda_{a2}, \bar{x}(j-1, 2i-1, p_1, d_1))^2}{A(\lambda_{a2}, \bar{x}(j-1, 2i-1, p_1, d))^2},$$

for $(k-1).2^j \leq a1, a2 \leq (i-1).2^j+2^{j-1}-1$ and $[d_1] \leq d \leq [d_1]+1$. The error obtains its maximum when $a1=(i-1).2^j$ and $a2=(i-1).2^j+2^{j-1}-1$. It suffices to consider the case $$\frac{A(0, \bar{x}(j-1, 1, p_1, d_1))^2}{A(0, \bar{x}(j-1, 1, p_1, d))^2} \approx \frac{A(\lambda, \bar{x}(j-1, 1, p_1, d_1))^2}{A(\lambda, \bar{x}(j-1, 1, p_1, d))^2},$$

for $i=1$ and $\lambda=2^{j-1}-1$. The points $\bar{x}(j-1, 1, p_1, d_1)$ and $\bar{x}(j-1,1,p_1,d)$ are located on the line $L(0, 2p_1/N)$ which can be written $$\bar{x}(t) = \frac{2t}{N}\begin{pmatrix} 0 \\ p_1 \end{pmatrix} + (1-t)\begin{pmatrix} r \\ 0 \end{pmatrix} t \in R.$$

Let $\bar{x}(j-1,1,p_1,d_1)=\bar{x}(t_1)$ and $(j-1,1,p_1,d)=\bar{x}(t)$. Then $$A(0, \bar{x}(t_1)) = \frac{1}{t_1} \text{ and } A(0, \bar{x}(t)) = \frac{1}{t}.$$

We have $$\frac{A(\lambda, \bar{x}(t_1))}{A(\lambda, \bar{x}(t))} = \frac{r-(1-t)r\cos\lambda - tp_1\frac{2}{N}\sin\lambda}{r-(1-t_1)r\cos\lambda - t_1 p_1\frac{2}{N}\sin\lambda}$$

$$= \frac{t}{t_1} \frac{1 + \left(\frac{1-t}{t}\right)(1-\cos\lambda) - \frac{2p_1}{rN}\sin\lambda}{1 + \left(\frac{1-t_1}{t_1}\right)(1-\cos\lambda) - \frac{2p_1}{rN}\sin\lambda}$$

$$\approx \frac{t}{t_1}$$

$$= \frac{A(0, \bar{x}(t_1))}{A(0, \bar{x}(t))}.$$

The number of points of intersection increase with $\lambda$. In fact we have $|t_1-t|$ $$|t_1 - t| \propto \frac{1}{N\sin\lambda}.$$

Hence $$\left|\left(\frac{1-t}{t} - \frac{1-t_1}{t_1}\right)(1-\cos\lambda)\right| \leq \frac{c(1-\cos\lambda)}{N\sin\lambda} = \frac{c\sin\lambda}{N(1+\cos\lambda)},$$

for some constant c. At the first steps of the iteration the error will be extremely small $1/N^2$ and then increase to $1/N$ at the final step.

Now we return to the three-dimensional case, $z \neq 0$. We introduce the notations $$I(j, i, \bar{x}, z) = \sum_{a=(i-1)\cdot 2^j}^{i\cdot 2^j-1} A(\lambda_a, \bar{x})^2 G(\lambda_a, A(\lambda_a, \bar{x})\bar{x} \cdot \hat{p}(\lambda_a), A(\lambda_a, \bar{x})z)$$

and $$\tilde{I}(j,i,p_1,p_2,z)=I(j,i,\bar{x}(j,i,p_1,p_2),z).$$

We have the relation $$\tilde{I}(j,i,p_1,p_2,z) \approx \tilde{I}(j-1,2i-1,p_1,d_1,z) + \tilde{I}(j-1,2i,d_2,p_2,z),$$

We will use the same approximation as before the only difference is that we have to adjust the value of the variable z.

$$\tilde{I}(j-1, 2i-1, p_1, d_1, z) \approx c_1 \frac{(A(\lambda_{\bar{a}}, \bar{x}_1))^2}{(A(\lambda_{\bar{a}}, \bar{x}_2))^2} \tilde{I}(j-1, 2i-1, p_1, [d_1], z_1) +$$

$$c_2 \frac{(A(\lambda_{\bar{a}}, \bar{x}_1))^2}{(A(\lambda_{\bar{a}}, \bar{x}_3))^2} \tilde{I}(j-1, 2i-1, p_1, [d_1]+1, z_2),$$

where $\bar{a}=(i-1)\cdot 2^{j-1}-1$, $\tilde{\lambda}=(i-1)\cdot 2^j+(2^{j-1}-1)/2$ the average angle and $$z \cdot A(\tilde{\lambda}, \bar{x}_1) = z_1 \cdot A(\tilde{\lambda}, \bar{x}_2) = z_2 \cdot A(\tilde{\lambda}, \bar{x}_3).$$

In general $z_1$ and $z_2$ are not integers but since the weight function and the points of intersection $\bar{x}_2$ and $\bar{x}_3$ are independent of z we can perform an interpolation of the variable z in the usual way. The accuracy of the approximatation in the z-direction depends on the previous condition, i.e., $$\frac{A(\tilde{\lambda}, \bar{x}_1)}{A(\tilde{\lambda}, \bar{x}_2)} \approx \frac{A(\lambda_a, \bar{x}_1)}{A(\lambda_a, \bar{x}_2)} \text{ and } \frac{A(\tilde{\lambda}, \bar{x}_1)}{A(\tilde{\lambda}, \bar{x}_3)} \approx \frac{A(\lambda_a, \bar{x}_1)}{A(\lambda_a, \bar{x}_3)}$$

for $(i-1)\cdot 2^j \leq a \leq (i-1)\cdot 2^j+2^{j-1}-1$.

What is claimed is:

1. A computer tomography method for obtaining amapping of a variable in an object, said variable being measured in the form of line integral values over a multitude of lines, crossing said object, the multitude of measured lines being subdivided into families of lines, which families are enumerable in an order determined by successive relative angular shifts between patterns of lines in successive families, characterized in that a) in a first step, groups are combined out of said families, each group consisting of a first prime number of families of lines having adjacent position in said order, said lines of said highest and lowest order of families forming a multitude of intersection points between lines belonging to one famly and lines belonging to another family, and calculating for each of said intersection points of the sum of the line integral values for the two respective said lines intersecting at that point, and further adding values interpolated to said points from eventual intermediate families, said first step resulting, for each said group of families, in a plurality of points in a plane, for which points individual sum values are stored, said sums forming space distributions, one for each said group, b) in a successive step combining a further prime number of previously combined groups, with their calculated space distributions, representative of adjacent positions in said order into further groups representative of a number of families which is said further prime number times that of an immediately preceding step, having successive positions in said order, and calculating for points of intersection between those lines belonging to the families of the lowest and highest order within the number of families comprised in each combined group, of sums of values representative of the two respective space distributions, and summing thereto values for the aforesaid points of intersection taken for distributions belonging to eventual intermediate groups, either for points coinciding with those having calculated individual sums using such sums, or, for points not so coinciding, adding values interpolated from adjacent points in a respective space distribution, forming in said successive step higher order space distributions, to a number which is reduced by the factor of said further number compared to that of the starting point of said successive step, c) and repeating said second step until obtension of a final space distribution.

2. A computer tomography method of claim 1, characterized in that said interpolations are performed by linear interpolation of values belonging to points of intersection regarding a line participating in a respective intersection point, for which an interpolated value is desired.

3. A computer tomography method of claim 1, characterized in that said interpolations are performed taking into account neighbour distribution points in the plane, belonging to more than one line.

4. A computer tomography method of claim 1, characterized in that said first prime number is 2.

5. A computer tomography method of claim 4, characterized in that each said further prime number is 2.

6. A computer tomography method of claim 5, wherein each family of lines consists of lines which are mutually parallel, characterized in that the last repeated second step is performed by two combined groups, symmetrized in relation to a direction at right angles to an angle belonging to a family of lines which is at an extreme end of said enumerable order, thus obtaining a set of sum values which correspond to pixels in a cartesian system of screen pattern.

7. A computer tomography having a plurality of detectors for sensing intensities along a multitude of lines, some of which are intersecting each other, said lines intersecting an object to be tomographed, said plurality of detectors being connected to a calculator for calculating pixel values for the intersected object, characterized in that the said calculator is provided with means for calculating partial sums according to claim 1.

* * * * *